(12) United States Patent
Tsai et al.

(10) Patent No.: US 9,514,431 B2
(45) Date of Patent: Dec. 6, 2016

(54) COMPACT MOBILE-READER SYSTEM FOR TWO-WAY WIRELESS COMMUNICATION, TRACKING AND STATUS MONITORING FOR TRANSPORT SAFETY AND SECURITY

(71) Applicants: Han-Chung Tsai, Darien, IL (US); Yung Y. Liu, Hinsdale, IL (US); Hok L. Lee, Westmont, IL (US); Brian Craig, Downers Grove, IL (US); Kevin Byrne, Carol Stream, IL (US); Ketan Mittal, Lemont, IL (US); Justin C. Scherer, Naperville, IL (US)

(72) Inventors: Han-Chung Tsai, Darien, IL (US); Yung Y. Liu, Hinsdale, IL (US); Hok L. Lee, Westmont, IL (US); Brian Craig, Downers Grove, IL (US); Kevin Byrne, Carol Stream, IL (US); Ketan Mittal, Lemont, IL (US); Justin C. Scherer, Naperville, IL (US)

(73) Assignee: UChicago Argonne, LLC, Chicago, IL (US)

( * ) Notice: Subject to any disclaimer, the term of this patent is extended or adjusted under 35 U.S.C. 154(b) by 158 days.

(21) Appl. No.: 14/451,218

(22) Filed: Aug. 4, 2014

(65) Prior Publication Data
US 2016/0034727 A1 Feb. 4, 2016

(51) Int. Cl.
*G06K 7/10* (2006.01)
*G08B 13/24* (2006.01)
(Continued)

(52) U.S. Cl.
CPC ....... *G06Q 10/0833* (2013.01); *G06K 7/10475* (2013.01); *G06K 19/0717* (2013.01);
(Continued)

(58) Field of Classification Search
CPC  G06K 7/10227; G06K 7/10366; G08B 13/24; H04Q 5/22; H04B 7/00
(Continued)

(56) References Cited

U.S. PATENT DOCUMENTS 5,222,399 A    6/1993   Kropp
5,565,858 A *  10/1996  Guthrie .................. G01S 19/09
                                                 235/385

(Continued)

OTHER PUBLICATIONS

Electronic Tracking for the Transport of Nuclear and other Radioactive Materials, Revision 1, 2012 World Institute for Nuclear Security, pp. 1-12.
(Continued)

*Primary Examiner* — Nam V Nguyen
(74) *Attorney, Agent, or Firm* — Cherskov Flaynik & Gurda, LLC (57) ABSTRACT

A system for monitoring a plurality radio frequency identification tags is described. The system uses at least one set of radio frequency identification tags. Each tag is attached to a container and includes several sensors for detecting physical conditions of said container. The system includes at least one autonomous intermediate reader in wireless communication with the frequency identification tags. The intermediate reader includes external wireless communication system, intermediate reader logic controller, and a self-contained rechargeable power supply. The system uses a central status reporting system in communication the intermediate reader.

20 Claims, 9 Drawing Sheets

(51) Int. Cl.
*H04Q 5/22* (2006.01)
*H04B 7/00* (2006.01)
*G06Q 10/08* (2012.01)
*G06K 19/07* (2006.01)
*G06K 17/00* (2006.01)

(52) U.S. Cl.
CPC ............. *G06K 2007/10504* (2013.01); *G06K 2017/0045* (2013.01)

(58) Field of Classification Search
USPC ... 340/573.3, 539.26, 10.33, 10.51; 235/375, 385, 487, 492
See application file for complete search history.

(56) References Cited

U.S. PATENT DOCUMENTS

| | | | |
|---|---|---|---|
| 5,640,151 A | 6/1997 | Reis et al. | |
| 5,936,523 A | 8/1999 | West | |
| 6,043,746 A | 3/2000 | Sorrells | |
| 6,288,521 B1* | 9/2001 | Meador | H02J 7/0022 320/118 |
| 6,747,558 B1* | 6/2004 | Thorne | G06K 19/07798 340/545.6 |
| 7,079,832 B2 | 7/2006 | Zalewski et al. | |
| 7,142,117 B2* | 11/2006 | Watanabe | G06K 19/0723 235/491 |
| 7,148,803 B2* | 12/2006 | Bandy | G08B 25/10 340/10.1 |
| 7,372,366 B2 | 5/2008 | Lyon et al. | |
| 7,492,254 B2 | 2/2009 | Bandy et al. | |
| 7,656,273 B2* | 2/2010 | Ehrman | G06Q 10/08 340/10.1 |
| 7,701,346 B2 | 4/2010 | Lindsay et al. | |
| 7,839,289 B2 | 11/2010 | Chung et al. | |
| 8,013,717 B2* | 9/2011 | Alberth, Jr. | G06Q 20/327 340/10.41 |
| 8,013,744 B2 | 9/2011 | Tsai et al. | |
| 8,258,953 B2* | 9/2012 | Stern | G01S 1/68 340/10.1 |
| 8,274,372 B2* | 9/2012 | Fujino | G06K 7/0008 340/10.4 |
| 8,325,043 B2* | 12/2012 | Shoarinejad | G06Q 20/409 340/10.1 |
| 8,427,306 B2* | 4/2013 | Mizoguchi | 340/539.11 |
| 8,928,463 B2* | 1/2015 | Landau | G06Q 10/087 340/10.33 |
| 2009/0212918 A1* | 8/2009 | Bandy | A01H 5/0261 340/10.1 |
| 2013/0057390 A1* | 3/2013 | Watt | G06K 19/0717 340/10.1 |

OTHER PUBLICATIONS

ARG-US RFID System for Management of High-Risk Materials, Argonne National Laboratory, pp. 1-2.
J. Anderson, et al., Tracking and Monitoring with Dosimeter-Enabled ARG-US RFID System, Argonne National Laboratory, 1 page.
B. Craig, et al., Integration of ARG-US RFID and DOE Transcom, Argonne National Laboratory, 1 page.

* cited by examiner

COMPACT MOBILE-READER SYSTEM FOR TWO-WAY WIRELESS COMMUNICATION, TRACKING AND STATUS MONITORING FOR TRANSPORT SAFETY AND SECURITY

CONTRACTUAL ORIGIN OF THE INVENTION

The U.S. Government has rights in this invention pursuant to Contract No. OJ-30481-0065A between the U.S. Department of Energy and the University of Chicago representing Argonne National Laboratory.

BACKGROUND OF THE INVENTION

1. Field of the Invention

One embodiment of the present invention is directed to a system of devices facilitating two-way wireless communication between status reporting devices and a central command and control system. Another embodiment is directed to a multi-purpose tracking and control system using autonomous tags.

2. Background of the Invention

In one embodiment, the invention comprises a system that addresses the needs of secure transportation of valuable, hazardous, or radioactive material. In one embodiment, the system provides a set of monitoring tags, a mobile communication point in proximity to the set of tags, and at least one central command and control interface in communication with at least one mobile communication point.

A need exists in the art for a system capable of secure monitoring of valuable or hazardous shipments along every stage of transit. The system should provide continuous status updates, and not rely on waypoint reading of information. The system should not require attention from the driver conveying the shipment, to prevent tampering and to prevent distraction of a vehicle operator. The system must be autonomous and continue to gather information about the system even in instances where there is no communication link with the central monitoring station.

SUMMARY OF INVENTION

An object of the invention is to provide a system for monitoring the status of valuable or hazardous cargo. A feature of the invention is that it comprises a set of status monitoring tags, each of which includes monitoring and communication components. An advantage of the invention is that it is capable of monitoring of containers within a shipment independently of one another.

Another object of the invention is to provide a system that accounts for each container within a shipment. A feature of the invention is that each shipment status monitoring tag is assigned an independent identifier and the physical location of each shipment is noted within the device. An advantage of the invention is that the loss of a single container will be immediately apparent and reported autonomously.

Yet another object of the invention is to provide a system that detects intrusions into containers within a shipment. A feature of the invention is that each container comprising a shipment includes a status monitoring tag which includes a container physical integrity sensor, in one embodiment. An advantage of the invention is that the status of each container is known during the entirety of the duration of the conveyance of the shipment.

A further object of the invention is to provide a system which lists the contents of each shipment. A feature of the invention is that each container bearing a status monitoring tag further accounts for the contents of the container within the shipment. An advantage of the invention is that it facilitates knowledge of the contents of each shipment, with verification through use of sensors within container status monitoring tags.

An additional object of the invention is to provide a system which indicates the status of each shipment. A feature of the invention is that each status monitoring tag is in communication with a mobile communication point. An advantage of the system is that the mobile communication point can centralize status messages of the tags within the system and forward the status information to a central command and control interface.

Another object of the invention is to provide a system where communications between the shipment and a central command and control interface occur even where a direct data connection is not available. A feature of the system is that the mobile communication point can cache status information and transmit same to the central communications system when a direct communication path is not available without input from a vehicle operator. An advantage of the system is that the system is able to autonomously send status messages to the central command and control interface to account for time periods when the shipment was not within range of a network connection.

A further object of the invention is to provide a system where status monitoring tags are capable of long term autonomous operation. A feature of the invention is that each monitoring tag comprises a battery circuit with a ten-year lifecycle and can associate with mobile communication points per autonomous settings. An advantage of the system is that each tag can be reused with different shipments and does not require extensive reconfiguration.

An added object of the invention is to provide an expandable inventory tracking shipment. A feature of the invention is that the components that comprise the system are scalable on demand and can accommodate many types of shipments. An advantage of the system is that it can be used at any scale from individual containers to fleet management for large enterprises.

Yet another object of the invention is to provide a tracking system not dependent on the vehicle type or actions by a vehicle operator. A feature of the invention is that other than proximity between the status monitoring tags and the mobile communication points, the system is independent of any vehicle accessories. An advantage of the system is that it can be installed on any means of shipping containers and does not rely on equipment found within a vehicle. Another advantage of the system is that it can be used where there is no direct network connection, such as in the air.

A system for monitoring a plurality radio frequency identification tags comprising; at least one set of radio frequency identification tags wherein each tag comprises a tag body wherein said tag body contains a means to attach said tag body to at least one container, a plurality of sensors for detecting physical conditions of said container, a power supply in communication with said body, tag radio communication means, tag control logic, tag storage memory containing status of said plurality of sensors; at least one autonomous intermediate reader in wireless communication with said at least one set of radio frequency identification tags wherein said intermediate reader comprises tag radio communication means, external wireless communication means, intermediate reader logic controller, a self-contained rechargeable power supply; at least one central status reporting system in communication with said intermediate reader; and wherein said set of radio frequency tags establishes a local network with said intermediate reader which in turn communicates with said central status reporting system.

BRIEF DESCRIPTION OF DRAWING

The invention together with the above and other objects and advantages will be best understood from the following detailed description of the preferred embodiment of the invention shown in the accompanying drawings, wherein.

DETAILED DESCRIPTION OF THE INVENTION

The foregoing summary, as well as the following detailed description of certain embodiments of the present invention, will be better understood when read in conjunction with the appended drawings.

To the extent that the figures illustrate diagrams of the functional blocks of various embodiments, the functional blocks are not necessarily indicative of the division between hardware circuitry. Thus, for example, one or more of the functional blocks (e.g. processors or memories) may be implemented in a single piece of hardware (e.g. a general purpose signal processor or a block of random access memory, hard disk or the like). Similarly, the programs may be stand-alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and preceded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Figure 1:
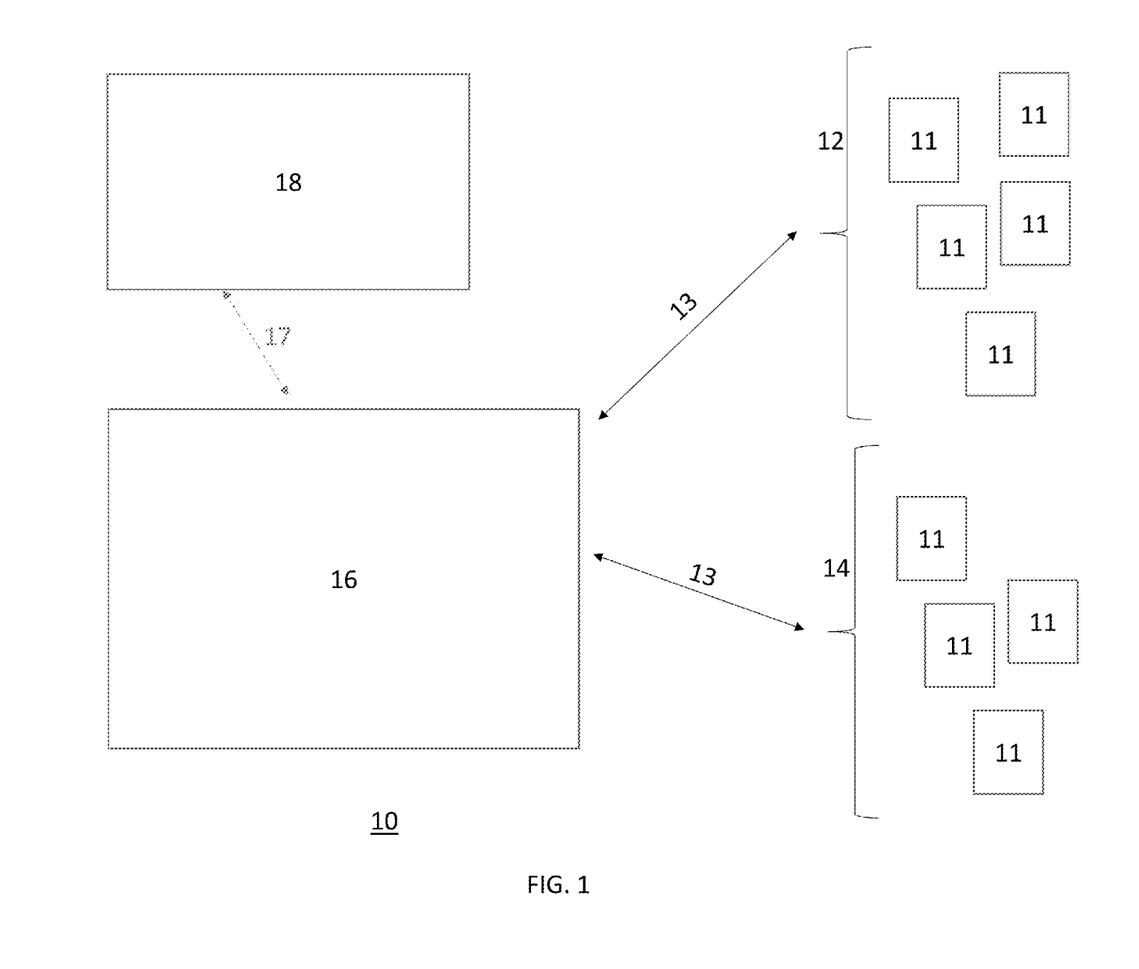
FIG. 1 depicts a schematic overview of one embodiment of the system.

Turning first to FIG. 1, depicted therein is a schematic overview of the system 10. The system 10 comprises two sets of tags 12,14. Each set comprises at least one status monitoring tag. In the embodiment shown in FIG. 1, the first set 12 comprises five status monitoring tags while the second set 14 comprises four status monitoring tags. However, this configuration is only exemplary and the system is scalable and configurable to any number of tags. In one embodiment, a set of status monitoring tags comprised up to one hundred tags used in one set. A theoretical limit of several thousand tags is imposed on the system. The aspect of the system which controls the number of concurrently operating tags is the communications channel bandwidth. In one embodiment, once the number of tags in a set exceeds a hundred, the set is broken down into subsets to prevent network congestion and concurrent transmission issues.

Further, while the embodiment shown in FIG. 1 has divided the tags 11 into a first set 12 and a second set 14, the tags 11 can be divided into an arbitrary number of logical sets and tracking sets can be divided into multiple shipments, as dictated by each application of the system. In other embodiments, the tags 11 are not divided into logical sets at all, but instead comprise a unitary set.

As shown in FIG. 1, each set is in local wireless communication 13 with a mobile communications point 16. In one embodiment, the mobile communications point 13 is in direct communications with each tag 11, following the wheel and spoke paradigm of wireless networking, in one embodiment. The mobile communications point 16 radio exchanges messages with each tag 11 in a round-robin manner, dividing its broadcast time between communications with each tag in order, as well as intervals during which the mobile communications point 16 is searching for new tags 11 that have entered its wireless communications 13 range. In one embodiment, the wireless communications occurs using low energy Bluetooth, in other embodiments, different types of wireless communication standards are used, such as wifi. The wireless communications are used to exchange packets of information comprising the status of each tag 11 as well as additional payload information such as an identifier. As will be described below, the communications 13 includes reading of status of each tag 11 as well as providing configuration and other updates to each tag 11.

As will be more clearly described below, the mobile communications point 16 comprises a means of providing wireless tag communication 13, data processing and storage, as well as an intermittent communications channel 17 to a central command and control interface 18. In one embodiment, the intermittent communications channel 17 comprises a cellular connection for sending of compressed and encrypted status information from the status monitoring tags 11 in communications with the mobile communications point 16. In another embodiment, the intermittent communications channel 17 comprises a satellite connection. In yet another embodiment, the communications channel 17 comprises a dual connection, with a direct connection to the central command and control interface 18 and a second connection to the transport vehicle system. In this embodiment, the information from the mobile communications point 16 is transmitted to the central command and status interface using the vehicle system as well as the direct connection.

In another embodiment, the mobile communications point 16 intermittent connection 17 is configured to exploit available external network connections that come in range to the mobile communication point, such as at locations within range of cellular towers or stations along a railway.

In these embodiments, the intermittent communication 17 and the local wireless connection 13 are different physical radios. In another embodiment, the same radio is used for both functions, dividing time between the intermittent communication 17 and the local wireless connection 13. In such an embodiment, the local wireless connection 13 takes precedent to the intermittent communication and therefore there is no loss of status information from the status monitoring tags 11. In another embodiment, the same physical radio is used for both functions, but it comprises more than one antenna allowing for non-interfering messages to be sent over the wireless medium, using separate channels.

In one embodiment, the intermittent communication 17 is encrypted, while the local wireless connection 13 is not encrypted. Instead, the security of the messages is assured by the low power of the transmission, the terseness of the messages sent from the status monitoring tags 11, and the physical separation between the tags and other sources of radio signals, as occurs within a metal shipping container. In one embodiment, the use of encryption for the local communications 13 is a configurable option, depending on the need for security. For instance, as the status monitoring tags 11 leave an inherently secure environment, the encryption of the local connection 13 is triggered by a negotiation of new configuration information between each status monitoring tag and the mobile communications point 16. Encryption within each tag 11 imposes a processing cost for each tag, which in turn affects the battery life of each tag 11. Nonetheless, in some embodiments, the encryption of the local wireless communication connection 13 is constantly enabled.

Figure 2A:
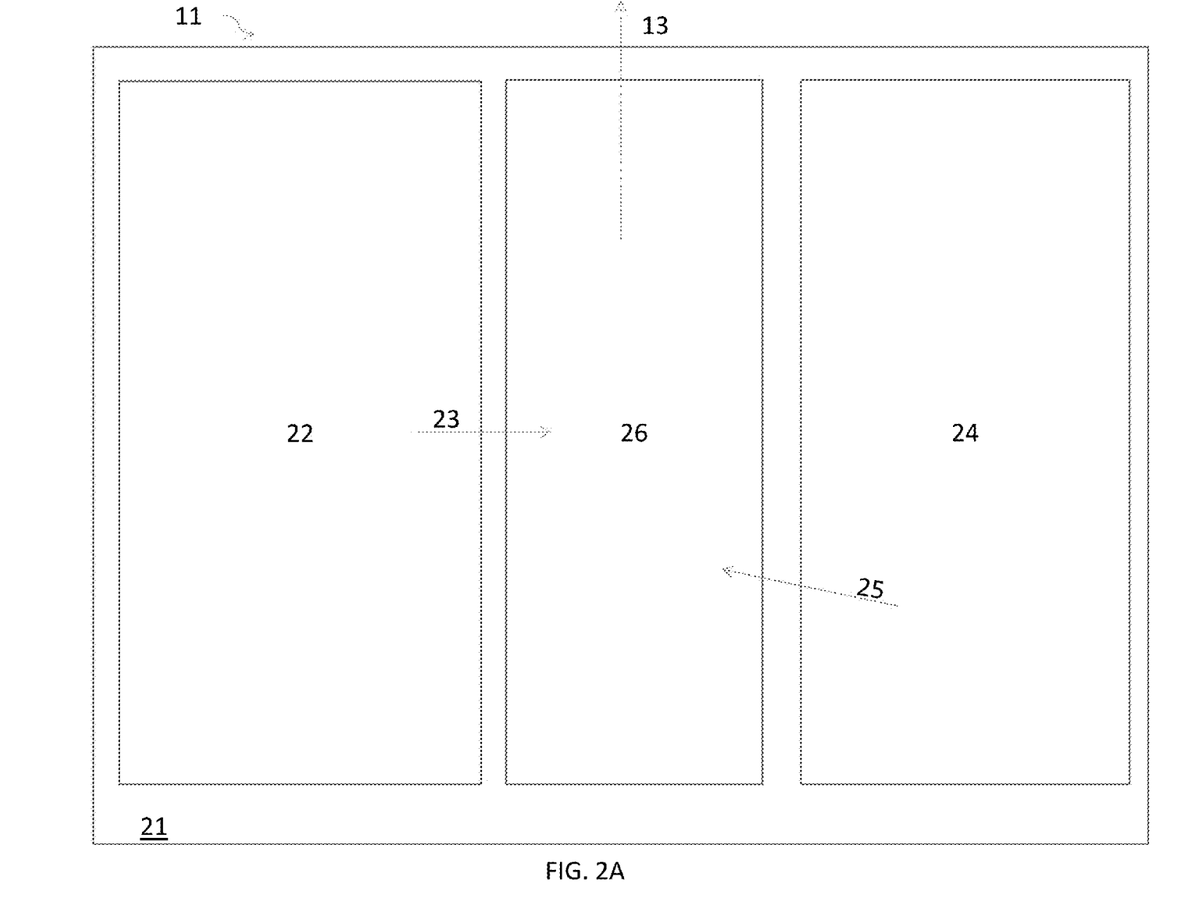
FIG. 2A depicts a schematic overview of one tag comprising an embodiment of the system.

Turing to FIG. 2A, shown therein is a schematic of one status monitoring tag 11 pursuant to an embodiment of the instant invention.

As shown in FIG. 2A, the embodiment of the status monitoring tag 11 comprises a tag body 21 featuring a securing mechanism. In one embodiment, the securing mechanism (not shown) comprises a physical intrusion system, using a series of locks and one-way fasteners. In one embodiment, the tag body 21 is designed to include an intrusion detection indicator which is permanently tripped when the physical integrity of the status monitoring tag 11 has been compromised. This intrusion detector includes a frangible plastic element which shows signs of physical stress. In other embodiment, the intrusion detector comprises one or more break-apart seals which show that the physical integrity of the status monitoring tag has been compromised. In another embodiment, the status monitoring tag 11 includes a physical indicator which changes status on the basis of a detected logical intrusion into the tag 11 rather than a physical intrusion. In one embodiment, the tag 11 comprises a led indicator to show that the contents of the memory of the tag 11 have been altered and no longer pass an integrity test, such as a checksum value. Such a result could occur if the status monitoring tag 11 has suffered unauthorized access or if it has been exposed to damaging radiation, weather conditions, or other adverse environments.

Within the tag body 21 are contained three primary systems: a sensor system 22, a power system 24, and a tag logic system 26.

In one embodiment, the sensor system 22 comprises one or more sensors, such as temperature, pressure, radiation, and other sensors. The sensors are mounted on a circuit board or a carrier board comprising the system 22, in one embodiment. In one embodiment, the sensor system 22 comprises a dosimeter modified to communicate radiation information to a dosimeter digital interface. Said digital interface collects the dosimeter reading, adds identifying information, and sends the reading value over an interface connection 23 to the tag logic system 26. In one embodiment, the dosimeter is an off the shelf sensor, mounted on a circuit board with an added low power serial interface which comprises the interface connection 23. The sensor system 22 is coupled with the power system 24 through the tag logic system 26 using the power connection 25. Inasmuch as the power flows through the logic system 26, it can control the power to the sensor system, and shut down the sensor system 22 when a reading is not required, in one embodiment. In another embodiment, the power to the sensor system 22 flows independently of the logic system 26, such that the sensor system 22 can continue to take readings even if the logic system 26 is damaged or offline. In such an embodiment, the sensor system 22 includes temporary cache memory to store readings until a connection 23 to the logic system 26 is restored. For example, in one embodiment, the dosimeter reports prolonged radiation readings which cause the logic system 26 to enter into a fail safe mode, where the readings from the dosimeter continue to be gathered until the logic system 26 once again communicates with the sensor system 22.

While in one embodiment, the dosimeter comprises a neutron detector, in other embodiments, the sensor system 22 comprises any number of radiation detectors, or chemical detectors. Further, the sensor system 22 comprises a seal integrity detector, in one embodiment. In such an embodiment, the system is mounted directly on a container seal such that a loss of tension in the seal is detected by the sensor system 22. The sensor system 22 comprises a compact, low voltage detector with a low power consumption of approximately 3 mW. The sensor has a high counting efficiency of 20% for thermal neutrons, and a high saturation threshold ($3\times10^4$ cps) and a low gamma sensitivity ($<10^{-7}$).

In one embodiment, the neutron detector will generate a pulse for every detected neutron. The corresponding signal is send to the carrier board of the tag through a number of contact pins within the serial interface. In one embodiment, pin 6 on the 20 pin header, J12 is used. The number of pulses generated by the detector is counted by the microprocessor on the carrier board. The neutron count rate and accumulated counts are calculated using the pulse signals.

A suitable neutron detector used in the system can be obtained from a number of suppliers, including Radiation Detection Technologies, Inc. (RDT) of Manhattan, Kans.

In one embodiment, the sensor system 22 is a sealed unit within the tag body 20. Other components comprising the tag body 21 are replaceable, but the sensor system 22 is integrally and securely molded into the tag body 21, in one embodiment. To facilitate the determination of which kind of sensor system 22 is embedded within a tag body 20, different color codes are used on the external surfaces of the tag body 21, in one embodiment.

The tag body 21 further comprises the tag logic system 26 coupled to the sensor system 22 and the power system 24. The tag logic system 26 includes the wireless communication radio or radios used to establish communications 13 with the external mobile communication point. In one embodiment, the tag logic system 26 is configurable to enter into a communications hibernation mode. During this mode, the tag logic system 26 remains in communications 23 with the sensor system 22, but does not communicate using the wireless communications 13. In one embodiment, each tag 11 is configured to enter into a hibernation mode at set periods, while in another embodiment, the hibernation mode occurs on command received from the mobile communication point.

The tag logic system 26 comprises cache memory, a processing unit, the sensor interface, the power interface, and the wireless communications radio. In one embodiment, the cache memory uses flash memory rather than conventional EEPROM memory inasmuch as flash memory is less susceptible to disruption by radiation and dosimeters are an important application of the system.

The tag logic system 26 is powered by a tag power system 24. The tag logic system 26 is coupled to the tag power system 24 via a power connection 25. In one embodiment, the tag power system shown in detail in the schematic of FIG. 3 comprises four primary batteries. The batteries are not used in series or in parallel. Rather, each battery is run down independently of the remaining batteries. As such, in a four battery configuration, the power system 24 can last for up to a decade, depending on the frequency of the hibernation mode.

In one embodiment, the switching of the power system 24 occurs without control by the tag logic system 26. In another embodiment, the tag logic system 26 maintains a status of each battery, and yet in another embodiment, the logic system 26 selects which battery to use from the set of batteries on board.

In one embodiment, the battery system 24 is located on a removable cartridge within the tag body 21. Therefore, if the batteries have run low, the entire power system can be replaced. In another embodiment, each battery within the circuit is directly replaceable.

In one embodiment of the battery system 24, a charge pump or charge stabilizer is used. Inasmuch as the tag is designed for long term use and a battery switching circuit is used within the tag, the charge pump maintains a stable 3.3 voltage to the supply rails within the tag. In one embodiment, a Microchip MCP1256 charge pump is used to stabilize various 3.3V supply rails on the carrier board. The chip can generate a regulated 3.3 V output voltage from a 1.8 V to 3.6 V input. The MCP1256 charge pump can be obtained from commercial sources such as Microchip Technology, Inc. of Chandler, Ariz.

Figure 2B:
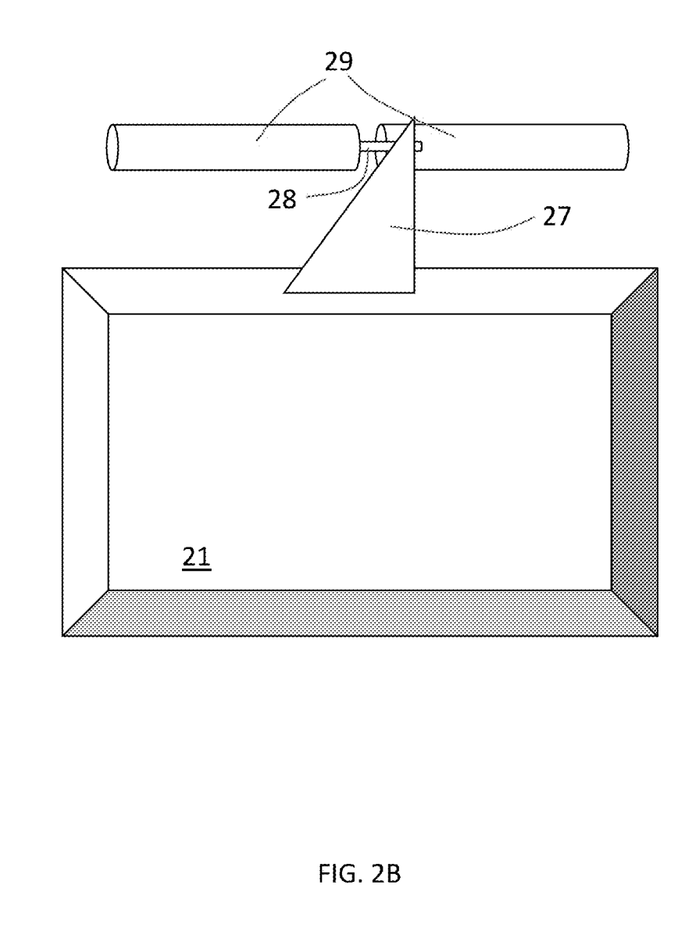
FIG. 2B depicts one tag comprising an embodiment of the system.

An external view of an enclosure of the tag 11 is shown in FIG. 2B. The tag body 21 is shown in the closed configuration in FIG. 2B. A flange 27 extends from the tag body. The flange 27 includes an aperture to receive a bolt 28. The bolt 28 joins together two segments of a locking belt 29. In the embodiment shown in FIG. 2B, the locking belt 29 is used to secure a drum containing sensitive material, such as radioactive material. In order to unlock the container, the belt 29 must be loosened, which in turn requires the bolt 28 to be removed from the flange 27. The flange includes an electrical continuity sensor which detects the absence of the bolt 28. The continuity sensor is built into the flange 27 and is in communication with the tag logic system 26. In one embodiment, the continuity sensor is located entirely within the interior of the tag body 21.

Figure 2C:
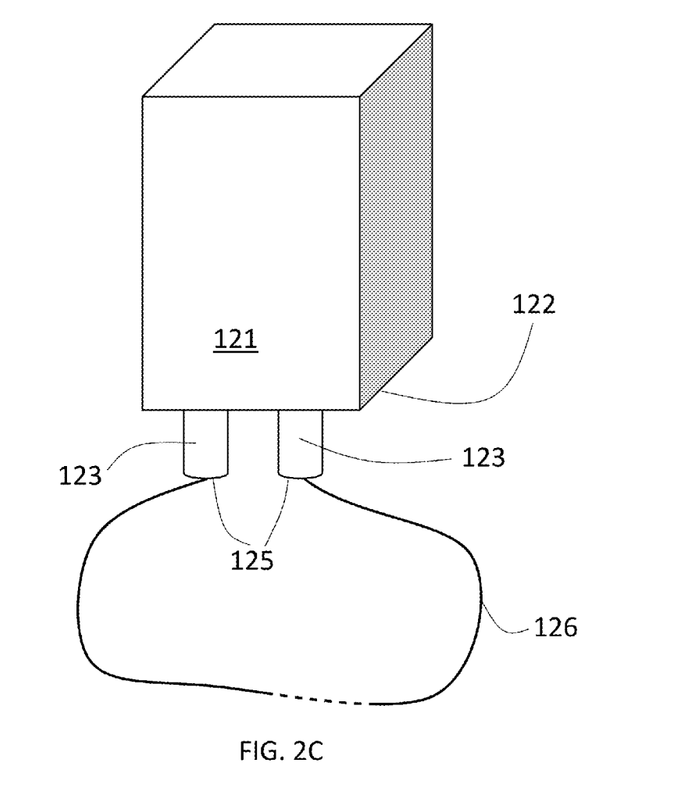
FIG. 2C depicts another tag comprising an embodiment of the system
Figure 2D:
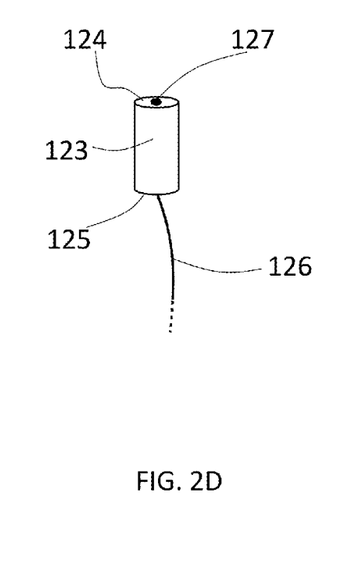
FIG. 2D depicts a component of the tag system comprising an embodiment of the system.

An alternative embodiment of the tag 110 is shown in FIGS. 2C and 2D. This embodiment uses a loop seal for tamper detection. The tag body 121 of this embodiment comprises a substantially cube shape having six sides. One side, such as the bottom side or surface 122 defines two apertures designed to receive two corresponding sensor plug 123. The sensor plug comprises a compressible material, such as a rubber or plastic. A first end 124 of the plugs 123 is received by the tag body 121. A second end 125 protrudes from the tag body. A conductor wire 126 extends from the second end 125 of the plug 123. The conductor wire 126 is insulated and forms a continuous path for electricity between the two plugs 123. The main body 121 of the alternative embodiment contains a continuity detector such that if one of the plugs 123 is removed from the main body 121 or the conductor wire 126 is cut, the tag body 121 detects an incursion.

As can be seen in FIG. 2D, the conductor wire 126, passing through the plug 123 forms a conductor wire header 127 which extends beyond the plug 123 first end 124. The header 127 completes the connection with one or more flexible receiving plates inside the tag body 121.

In one embodiment, the conductor wire 126 comprises a multi-strand conductor having multiple strands of wire. The tag body 121 detects any changes in conductivity in the conductor wire 126 and so an alarm is raised even if one of the sub-conductors are cut, as would happen if the wire was stretched or nicked. The conductor wire 126 can be of any length as shown with the dashed segment of the conductor wire 126. As such, this alternative embodiment 110 can be used to secure not only individual containers, but also rooms within a building or sets of drums. Inasmuch as the conductor wire 126 uses multiple strands, it is highly flexible and bendable, with a high response time. The tag 110 will detect an incursion within the wire in microseconds.

The use of the conductor wire 126 is the preferred embodiment inasmuch as it allows for a fast response without requiring much power, given that the tags 110 are battery powered. The amount of power used to maintain the continuity test is comparable to the first embodiment shown in FIG. 2B. In one embodiment it is only a few microwatts. An alternative embodiment uses fiber optic wire and detector. However, this embodiment is only suitable for hard wired installations, given the power required to maintain the fiber optic sensor.

Figure 3:
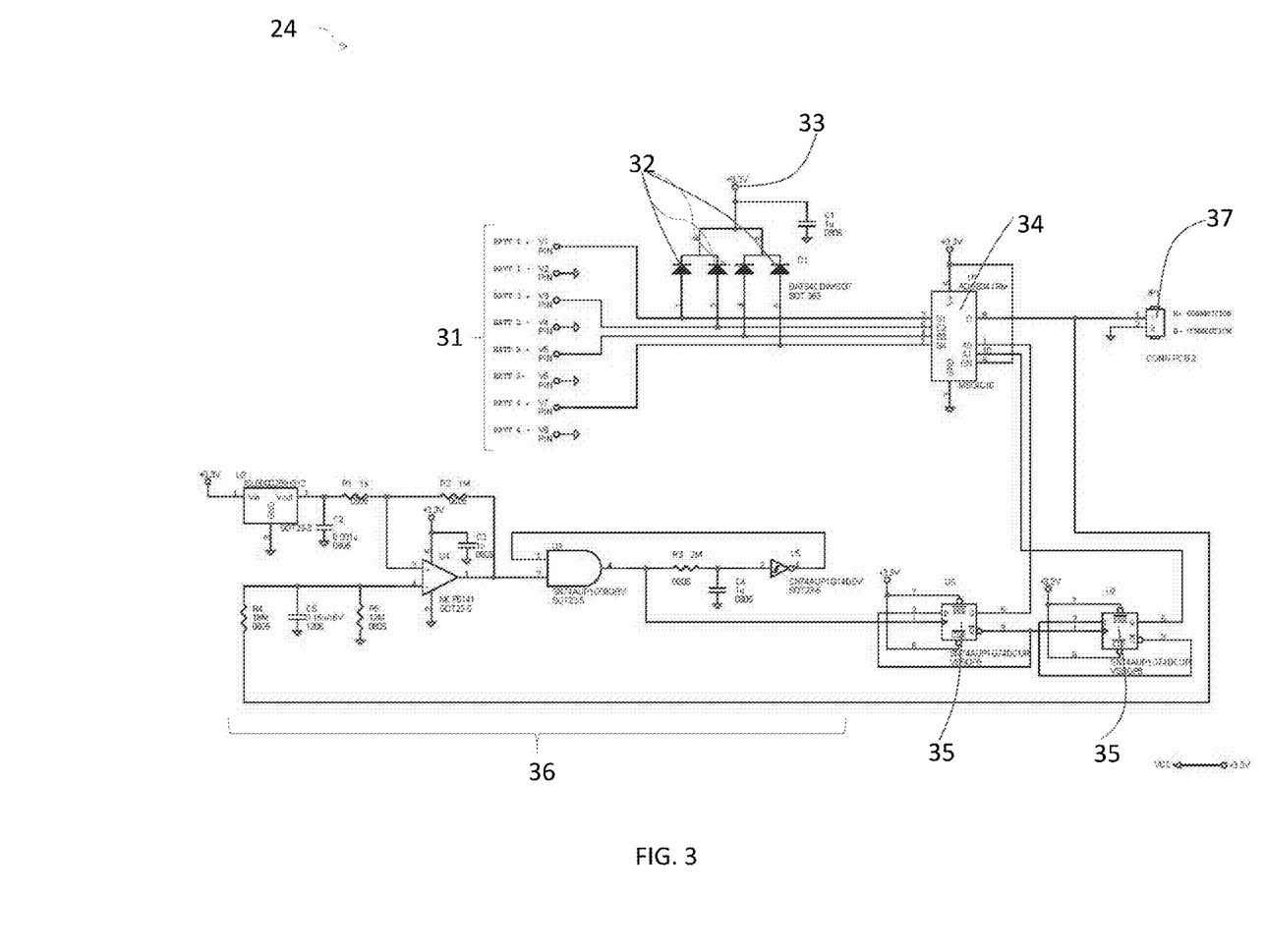
FIG. 3 depicts a schematic overview of the electrical system of one tag comprising an embodiment of the system.

Turning to FIG. 3, depicted therein is the diagram for the power system 24. The system comprises four batteries 31, in one embodiment. The batteries 31 are 3.3 V DC batteries, in one embodiment, each battery having a positive and negative terminal. The positive terminals are coupled to resistors 32 and an output terminal 33 and the programmable CMOS Amplifier 34. The output terminal 33 is active only as the resistance of the amplifier 34 exceeds that of the resistors 32.

The output of the amplifier 34 is passed through the voltage translators 35. The voltage translators respond to the gate logic 36 transmitting the current to the interface 37 such that only one of the batteries 31 is used at a time. The circuit ensures that when one battery begins to drain and the voltage drops, the circuit switches to the next battery, restoring the voltage level.

In the embodiment shown in FIG. 3, the circuit is capable of powering the tag logic 26 through the interface 37 for up to a decade, using non-rechargeable batteries.

Figure 4A:
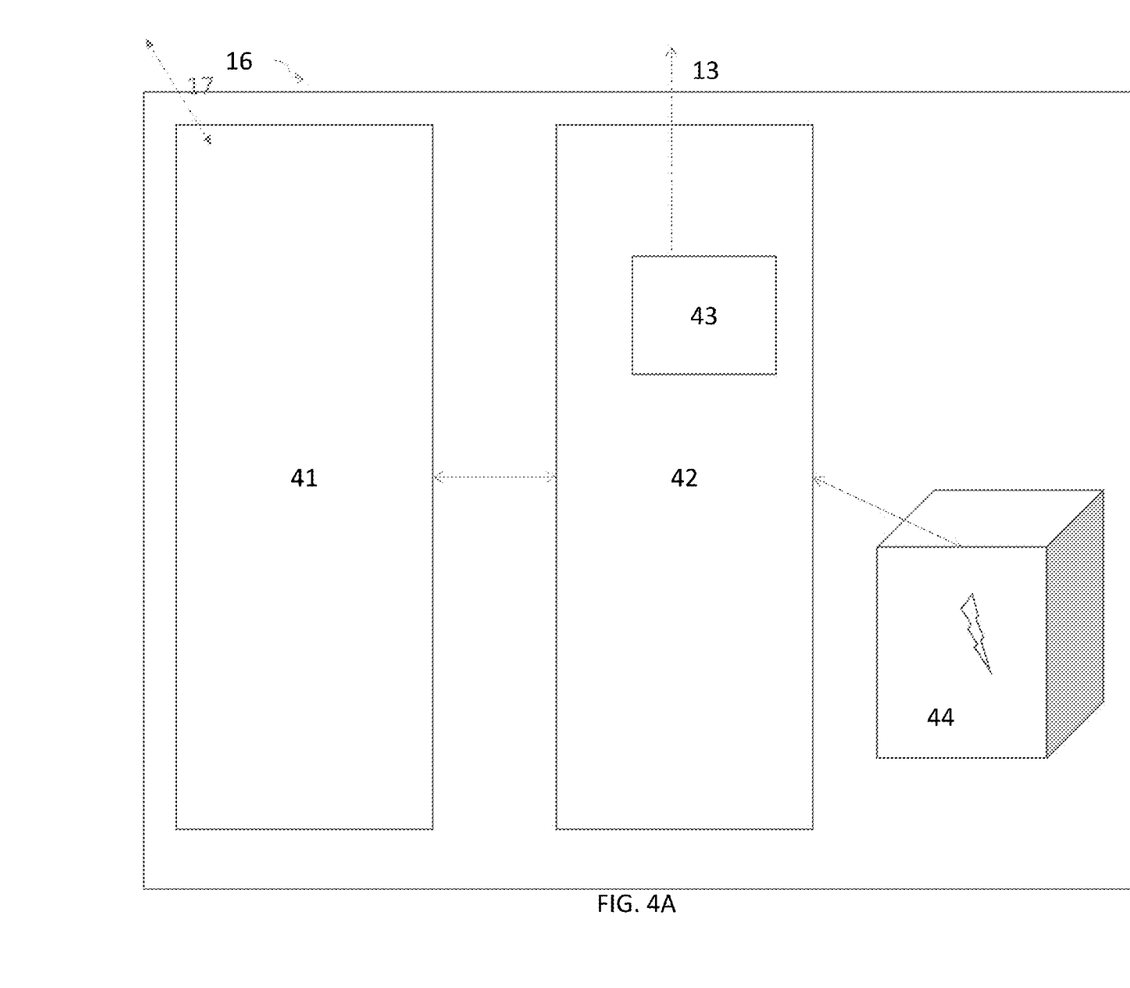
FIG. 4A depicts a schematic overview of the mobile communication point comprising an embodiment of the system.

Turning to FIG. 4A, depicted therein is a schematic overview of the mobile communication point pursuant to one embodiment of the system. The mobile communications point 16 comprises a cellular router 41, mobile point logic 42, and local wireless connection radio 43.

In the embodiment shown in FIG. 4, the local wireless connection radio 43 is shown as a component within the mobile point logic 42, however, in other embodiments, the radio is enclosed within its own subsystem or router. In any event the mobile point logic 42 includes a means to send and receive the local wireless signal 13 which is used to communicate with the tags as described above.

The mobile point logic 42 is coupled to an external communications means, such as the cellular router 41. The mobile point control logic 42 is also coupled to a power supply 44 enclosed within the mobile communications point 16. While the monitoring tags use non-rechargeable batteries in one embodiment, the mobile communications point 16 uses a rechargeable battery.

While the embodiment shown in FIG. 4 uses a cellular router 41 to establish the external connection 17, different communications systems can be installed in the mobile unit. In another embodiment, the mobile point logic 42 includes control hardware for an external antenna, obviating the need for an external router 41. In another embodiment, the cellular router 41 is decoupled from the logic 42 and upgraded with different technologies, depending on the deployment of the mobile point 16. In one embodiment, the cellular router 41 is replaced by a satellite uplink.

In one embodiment, the mobile point logic 42 does not comprise storage of values, other than cache memory to maintain values read from the associated tags while a connection 17 is unavailable.

In the embodiment shown in FIG. 4A, the mobile communications point 16 acts as a reader for status monitoring tags 11 located in the same vehicle as the mobile communications point 16. The mobile communications point 16 logic 42 assembles the data from each tag and forwards the data via an encrypted connection via the cellular router 41. The mobile communications point 16 interfaces directly with all status monitoring tags 11 within the range of its local wireless radio 43. For each tag, the mobile communications point 16 stores its sensor readings, its identifier, and date and time. As such, the mobile communications point 16 is able to determine if a tag has gone missing or if the tag's communications system has failed.

In one embodiment, the system mobile point 16 communicates with the tags 11 without input from the vehicle operator and driver. As such, the system of this embodiment is not a distraction for the driver, and the lack of user interface prevents the opportunity for unauthorized access.

In one embodiment, each tag in communications with the reader has a hard-coded identifier, such as a hexadecimal identifier. Each tag stores 64,000 of records with each record comprising the time data, the sensor value, and the sensor status. The payload is communicated to the access point along with the tag identifier. In this way, the access point obtains information more than simply binary 'yes' or 'no' information of prior art systems. Instead, each mobile communications point 16 can be programmed to respond to certain events, such as increases in radiation or the detection that one of the hazardous waste containers has gone missing.

In one embodiment, the communications with the tags include both reading and writing instructions. By writing certain data to the tags, the mobile access point is able to store inventory information, account for user events, reset alarm values as tags are moved from one mobile communications point to another.

Each mobile access point can be installed in a vehicle as a self-contained unit, in one embodiment. As products are shipped in many different vehicles, it may not be feasible to modify each vehicle's interior to include a mobile reader. However, such modifications are unnecessary in embodiments of the instant invention as the mobile reader is a stand-alone container that requires no coupling to vehicle systems. Instead, the mobile access point is but another piece of cargo for the transport vehicle.

Figure 4B:
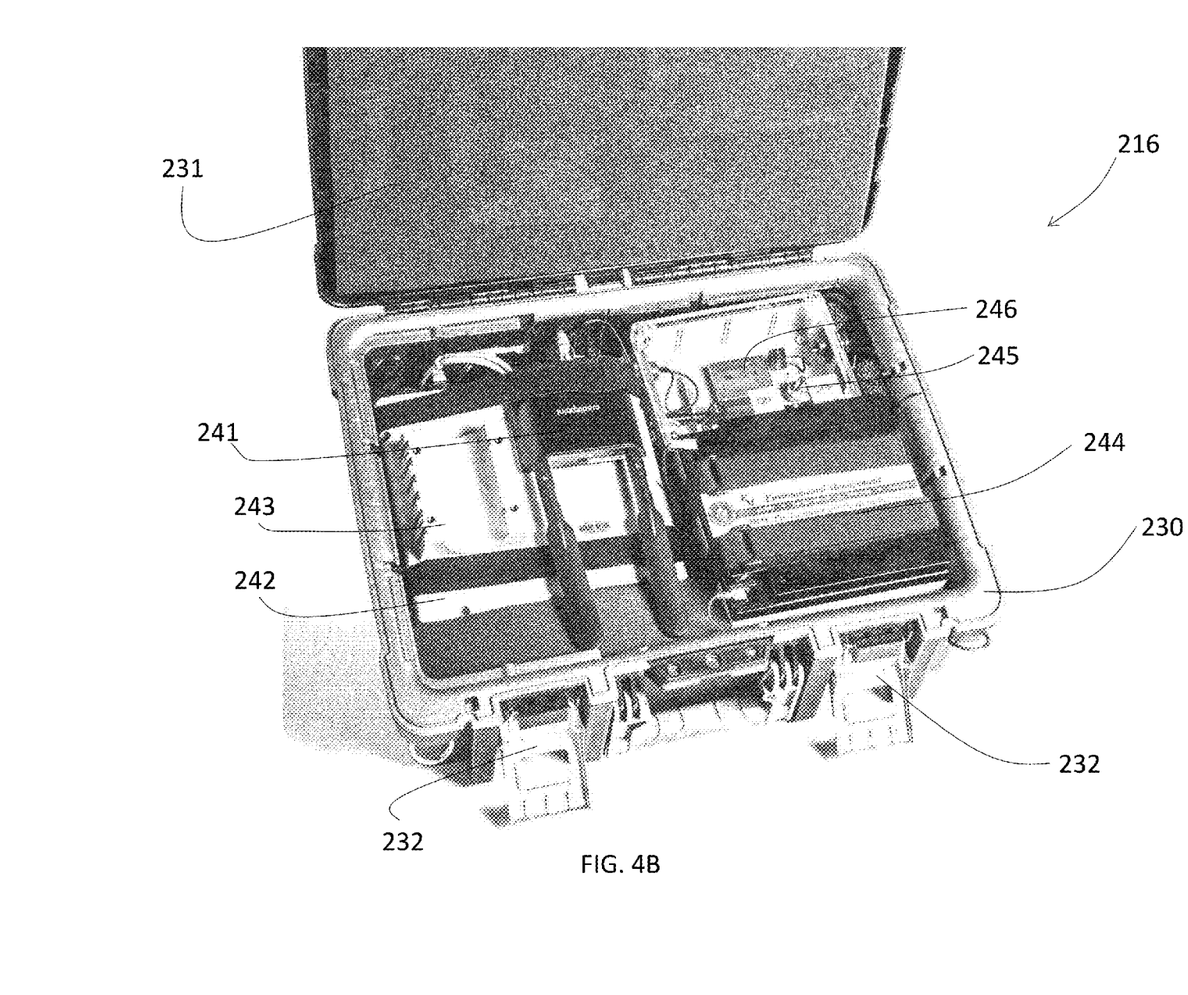
FIG. 4B depicts an embodiment of the mobile communication point comprising an embodiment of the system.

Another embodiment of the communication point 216 is depicted in FIG. 4B. The communication point 216 or reader 216 comprises an outer case 230 with a cover 231 extending over the entirety of the case and a pair of locking mechanisms 232. No wires protrude from the case. In the embodiment shown in FIG. 4B, the case 230 is portable and in the general shape of a briefcase, although other embodiments and shapes are considered, including case shapes that blend into the environment, such as another drum.

The reader 216 case 230 is made from a strong and tamper proof material, such as a metal alloy, and may incorporate one or more wheels. However, the case 230 includes at least one panel which allows for transmission of radio signals to the exterior of the case. The reader 216 is self-contained to the case 230, with no external connections required. In one embodiment, the case 230 includes an induction charger plate integrated into one of the panels, allowing for wireless charging of the components contained therein. In one embodiment, the case 230 is a Pelican box weighing about 20 pounds. The Pelican box is available from Pelican Products, Inc. of Torrance, Calif., but other rugged storage containers are suitable.

The reader 216 comprises a cellular router 241, the reader logic system 242 and a cellular module 241 coupled to the reader logic system 242. The system also includes a local wireless radio 243 in communication with the logic system 242 and a battery-based power supply 244. In the embodiment shown in FIG. 4B, the local wireless radio 243 is enclosed within the same module as the computer hosting the logic system 242. The embodiment shown in FIG. 4B also includes a power switch 245. However, the power switch is accessible only if one has secure access to the reader 216, such as by opening the locks 232. A DC-to-DC converter 246 is included within the system to ensure that the batteries are providing a stable 12V to the electronics.

In the embodiment shown in FIG. 4B, the reader 216 logic system 242 comprises an embedded multi-purpose control system running an optimized embedded operating system, such as Linux. The reader 216 logic system 242 functions autonomously, gathering data from tags using the local wireless radio 243, regardless of whether an external network connection is available. The reader 216 formats the data for transmission. In one embodiment, the reader 216 also encrypts the data before transmitting it via the external network connection, using the cellular router 241. Inasmuch as the logic system 242 is a modular multi-purpose computer the data processing capabilities within it are upgradeable and customizable, with Federal Information Processing Standards ("FIPS") compliant transmissions enabled when required.

The logic system 242 is modularized. The software running within the reader accepts different communications platforms, such as cellular, satellite, distributed node-based wireless network, and others. While the embodiment shown in FIG. 4B uses a wireless radio 243 for local communications, the logic system 242 accepts other communications modules, including infrared bursts for local communications, Bluetooth, and other local network data exchange standards. In one embodiment, the reader 216 software is written in C++ with different functions implemented as programming processes running on Linux.

The processes support multi-threaded and multi-processor operations depending on the hardware capabilities present in the embedded system used by the logic unit. The software within the reader logic includes a watchdog process which detects faults within the software or hardware environments. If a fault is detected, rather than crashing the reader 216, the watchdog processes restarts any faulty process, discarding the data and throwing an alert as necessary. The resulting logic 242 is fault-tolerant and will not shut down due to errant data or an attempt to flood the system with readings, as can happen through intentional intrusion or due to an errant tag transmission.

In the embodiment shown in FIG. 4B, the cellular router 241 includes a GPS receiver. By integrating the GPS function into the cellular router 241, the logic 242 can benefit from additional cellular triangulation, which improves reliability and location acquisition. Such assisted GPS improves performance to within 1 to 3 meters of tolerance, but results in increased power draw. In some embodiments, the logic 242 includes a GPS module independent of the cellular receiver or router 241. Such an embodiment is optimized for trips where cellular signal is difficult to acquire.

In another embodiment, the logic 242 includes a communications module compatible with the Iridium satellite constellation. The logic 242 includes at least one RS-232 serial connection for communicating with external network connection devices. Further, the embodiment shown in FIG. 4B also includes a USB port, using a USB 2.0 interface and chipset integrated into the embedded system hosting the logic 242. The logic 242 supports hot-swapping of communication modules and will start and stop processes as the hardware configuration changes.

As described above each reader is autonomous, but its functions are also fully programmable, including remotely, using the secure interface of the command and control system described below. The type of data that each logic subsystem 242 will transmit over the external connection, such as the cellular router 241, can be changed on demand or can be scheduled to change on basis of several factors, such as the interfacing equipment, battery level, availability of an external connection, and other criteria. In one embodiment, the logic 242 can be programmed to transmit XML, JSON, CSV, binary, other data formats.

Figure 5:
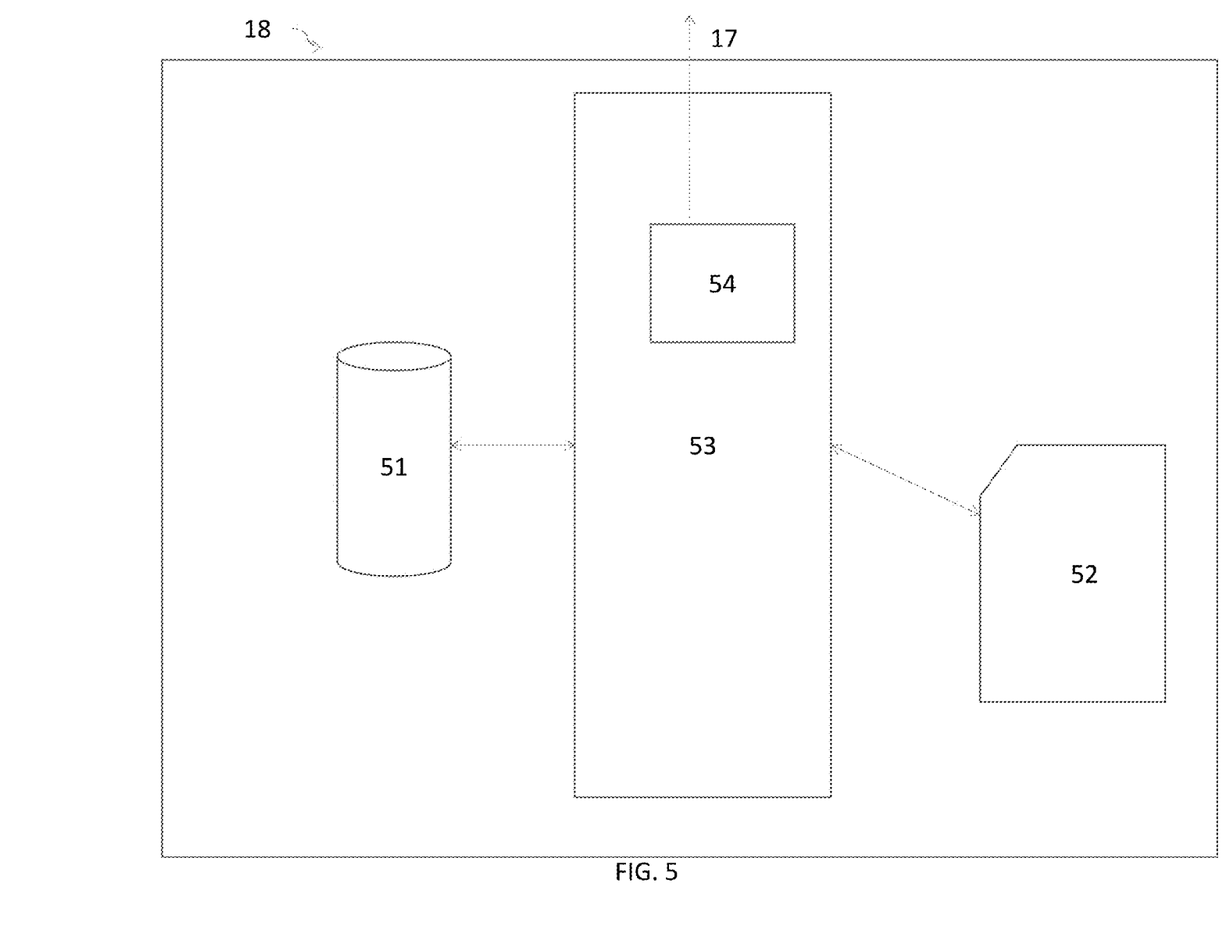
FIG. 5 depicts a schematic overview of the central command and control system comprising an embodiment of the system.

Turning to FIG. 5, depicted therein is a schematic overview of the central command and control system pursuant to one embodiment of the invention.

The command and control system comprise an organized data store 51, a user interface, 52 and control logic 53.

In one embodiment, the control logic 53 includes a communications system 54 which comprises an external connection 17. In this embodiment, each mobile communications point 16 communicates to the command and control system 18 using the external connection 17. While direct connections to the command and control system 18 are possible, in most instances, the communication between each mobile communications access point 16 and the command and control system 18 will occur over a public network, such as the Internet. In such external-network embodiments, the connection 17 will be encrypted.

In one embodiment, the control logic 53 comprises a multi-purpose computer. The computer includes access to a data store 51 such as a relational database. The data store 51 contains information received from the mobile communications points 16, including sensor readings, including: dates, times, and locations of the tags at the time of the readings.

The central command and control system facilitates the collection of data from the communications points 16, but also sends instructions to the devices in the field. In one embodiment, the communications point 16 forwards the instructions received from the command and control system to an interface available to the vehicle driver.

The central command and control system further comprises a user interface 52. In one embodiment, the user interface 52 comprises a dynamic website. The user interface 52 allows the end user to select individual status monitoring tags 11, or query sets 12, 14 of the tags 11. The user interface 52 allows the user to define events and alarms depending on the compiled readings of the sensors from the tags 11. The user interface 52 further allows the user to alert the driver to problems with a shipment, or to alert nearby entities (such as population centers, hazmat teams) of problems with a shipment.

In one embodiment, the user interface 52 is web based an accessible over the network, such as the Internet, and as such is usable by an end user without installation of client-side software.

In one embodiment, the user interface 52 allows the end user to define a campaign involving the sensor tags, wherein a campaign will involve a set of actions and status alerts. For example, for a transport campaign, the tag positions and sensor readings will be monitored and alarms triggered if the materials deviate from the intended transit path. In another campaign, the status of containers within a storage facility is monitored and alarms issue if one or more sensor threshold values are reached, or if one or more of the containers are unaccounted for.

Figure 6:
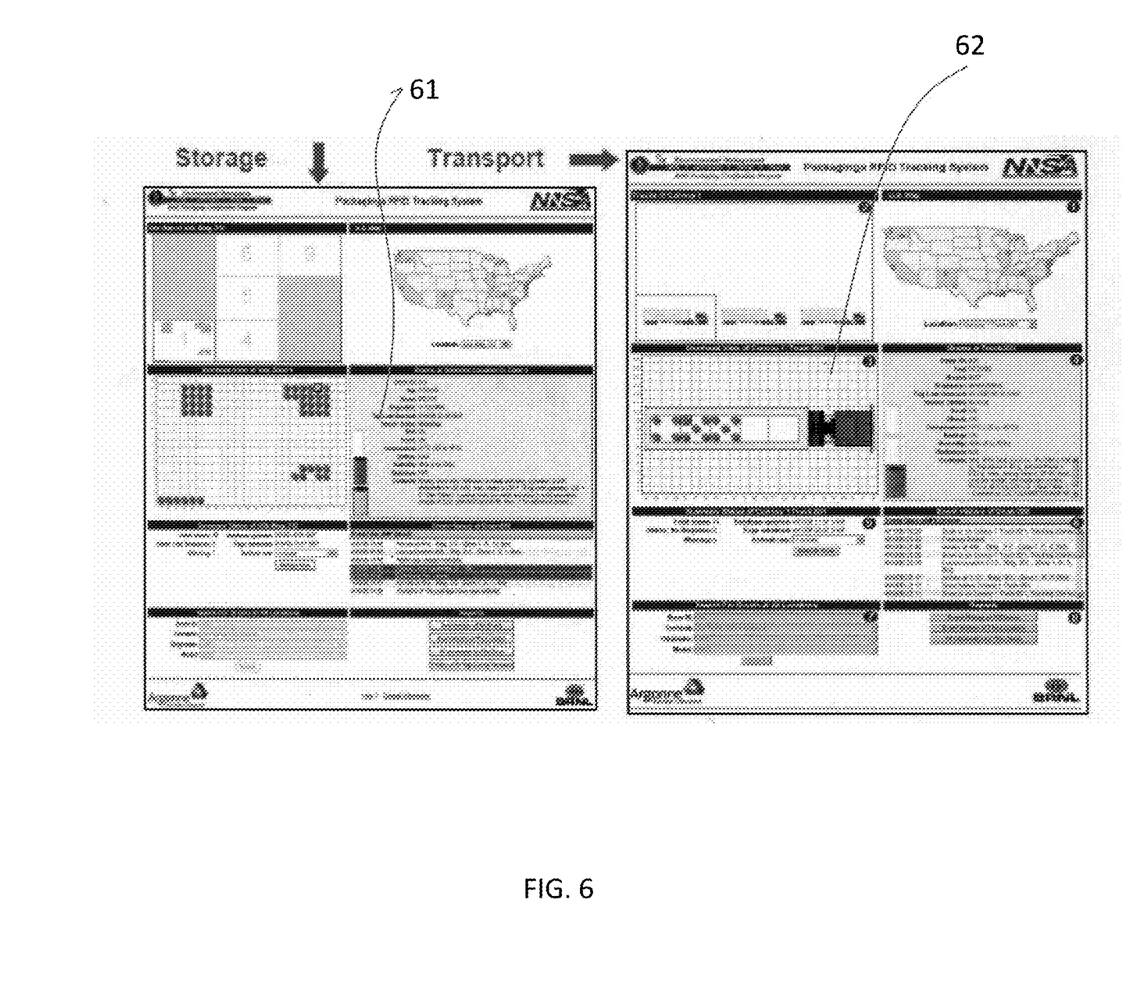
FIG. 6 depicts a sample user interface within an embodiment of the system.

As shown in FIG. 6, the users of the interface are able to monitor in real-time or near real-time the status of each container, with the same system and the same tag used during the time the container is in storage 61 as well as when it is being transported 62.

In one embodiment, the system is integrated with external status and monitoring systems, adding functionality to earlier systems. For instance, the TRANSCOM system is used to track location of road and rail vehicles, but does not provide the granularity of tracking individual containers within the system. In one embodiment, the instant system is capable of communicating the status of packages to compatible TRANSCOM terminals.

Features of the centralized system include the ability to map with real time status updates of all tags in use in the field. The system allows for route history and cookie crumbs to be displayed showing the paths taken by each container.

In one embodiment, the system allows for color-coding of each container, reflecting the status of the container within the interface. Different colors can be assigned to hazard levels, whether or not the package is staying within its designated route, whether the package is on time, and other objective criteria. In this manner, the "State of Health" (SoH) for each container can be polled and understood in real-time.

The interface also allows for generation of GIS reports when events occur, as well as generation of graphs and histories as delivery campaigns conclude.

The system is designed to be interoperable. History and other data from the system may be downloaded using data exchange formats, such as CSV, XML, JSON, and binary data formats. The exported data can be managed centrally and form the permanent record of each transit campaign or incident within a campaign.

The centralized system also includes geo-fencing of vehicles and routes. The geo-fencing forces the exclusion of certain vehicles and deliveries from defined population areas. In one embodiment, the system downloads data from the Census Bureau and identifies high population areas where certain shipments are not allowed. In one embodiment, the communications tag included in a truck interfaces with the truck anti-theft system and disables the engine if the truck enters a disallowed area or other fenced off area. In another embodiment, if the truck appears headed to such an area, its motive system is disabled after providing a warning and notice to the driver.

While FIG. 5 described the central command and control system, in some embodiments, a completely implemented command and control system is not necessary. Each mobile point, such as the reader 216 can operate independently, queueing messages until they are retrieved and processed. Each reader is customizable to transmit different message types, depending on the type of receiving device. For example, if a centralized system is not used, each reader is programmed to transmit a summary of the data and transmit same via an efficient system to a data gathering device (such as even a tablet) that is in proximity to the reader.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

The embodiment of the invention in which an exclusive property or privilege is claimed is defined as follows:

1. A system for monitoring a plurality radio frequency identification tags comprising:
   at least one set of radio frequency identification tags wherein each tag comprises a tag body wherein said tag body contains a means to attach said tag body to at least one container, a plurality of sensors for detecting physical conditions of said container, a power supply in communication with said body, tag radio communication means, tag control logic, tag storage memory containing status of said plurality of sensors; wherein power supply comprises a long life battery bank wherein each battery within the bank is used independently;
   at least one self-contained autonomous intermediate reader in wireless communication with said at least one set of radio frequency identification tags wherein said intermediate reader comprises tag radio communication means, external wireless communication means, intermediate reader logic controller, a self-contained rechargeable power supply; wherein said self-contained autonomous intermediate reader is not coupled to a vehicle used to convey the self-contained autonomous intermediate reader and tags; and
   at least one central status reporting system comprising a data store, a user interface, wireless communication link, and control logic, wherein said wireless communication link is in communication with said at least one autonomous intermediate reader;
   wherein said set of radio frequency tags establishes a local network with said intermediate reader which in turn communicates with said central status reporting system transmitting data from the at least one intermediate reader to the central status reporting system data store using the central status reporting system wireless communication link, said data store is in turn is processed by the central reporting system control logic.

2. The system of claim 1 wherein said each tag sensor comprises sensors for shock, temperature, surface gamma radiation load, surface neutron emission load, container structural integrity, container security.

3. The system of claim 1 wherein intermediate reader logic controller and tag control logic is programmed to allow the intermediate reader to alter the tag storage memory.

4. The system of claim 1 wherein each tag comprising the set of radio frequency tags is not in direct communication with the intermediate reader and wherein each tag is addressable by the intermediate reader via messages relayed from other tags in communication with the intermediate reader.

5. The system of claim 1 wherein said intermediate reader sends and receives commands from said central status reporting system without additional intervention.

6. The system of claim 1 wherein said intermediate reader is mobile.

7. The system of claim 1 wherein said intermediate reader is removably installed in proximity to the set of radio frequency identification tags.

8. The system of claim 1 wherein said intermediate reader is only accessible via said central status reporting system.

9. The system of claim 1 wherein said intermediate reader polls the status of said set of radio frequency tags at regular intervals and forwards said status to said central status reporting system at irregular intervals.

10. The system of claim 1 wherein said self-contained rechargeable power supply is selected to provide sufficient power for the duration of transit of said set of radio frequency identification tags.

11. The system of claim 1 wherein said intermediate reader comprises no external wires.

12. The system of claim 1 wherein said means to attach said tag body to the container comprises an insulated conducting wire loop.

13. The system of claim 1 wherein said autonomous intermediate reader further comprises a DC to DC converter.

14. The system of claim 1 wherein said external wireless communication means comprises an intermittent communications channel to the central status reporting system and wherein said autonomous intermediate reader caches data for transmission during periods of availability of communications with the central status reporting system.

15. The system of claim 1 wherein said central status reporting system comprises a data store.

16. The system of claim 1 wherein said autonomous intermediate reader comprises a watchdog process.

17. The system of claim 12 wherein said tag body detects a loss of integrity within the wire loop.

18. A system for monitoring a plurality radio frequency identification tags comprising:
   at least one set of radio frequency identification tags wherein each tag comprises a tag body wherein said tag body contains a means to attach said tag body to at least one container, a plurality of sensors for detecting physical conditions of said container, a power supply in communication with said body, tag radio communication means, tag control logic, tag storage memory containing status of said plurality of sensors; a discharge circuit in communication with the power supply; and a set of non-rechargeable batteries integrated into the discharge circuit; wherein the power supply comprises a long life battery bank wherein each battery within the bank is used independently;

at least one self-contained autonomous intermediate reader in wireless communication with said at least one set of radio frequency identification tags wherein said intermediate reader comprises tag radio communication means, external wireless communication means, intermediate reader logic controller, a self-contained rechargeable power supply; wherein said self-contained autonomous intermediate reader is not coupled to a vehicle used to convey the self-contained autonomous intermediate reader and tags and at least one central status reporting system in communication with said intermediate reader wherein said central status reporting system comprises a multi-purpose computer having a data store and a link to an external network wherein said intermediate reader communicates with said central status reporting system using said external network;

wherein said set of radio frequency tags establishes a local network with said intermediate reader which in turn communicates with said central status reporting system using the external wireless communications means.

19. A system for monitoring a plurality radio frequency identification tags comprising:

at least one set of radio frequency identification tags wherein each tag comprises a tag body wherein said tag body contains a means to attach said tag body to at least one container, a plurality of sensors for detecting physical conditions of said container, a power supply in communication with said body, tag radio communication means, tag control logic, tag storage memory containing status of said plurality of sensors; wherein the power supply comprises a long life battery bank wherein each battery within the bank is used independently;

at least one self-contained autonomous intermediate reader in wireless communication with said at least one set of radio frequency identification tags wherein said intermediate reader comprises tag radio communication means, external wireless communication means, intermediate reader logic controller, a self-contained rechargeable power supply; wherein said self-contained autonomous intermediate reader is not coupled to a vehicle used to convey the self-contained autonomous intermediate reader and tags; and at least one reporting system in communication with said intermediate reader; wherein said reporting system comprises a multi-purpose computer having a data store and a link to an external network wherein said intermediate reader communicates with said reporting system using said external network;

wherein said set of radio frequency tags establishes a local network with said intermediate reader which in turn communicates with said reporting system using the external wireless communication means.

20. The system of claim 19 wherein the reporting system comprises a data reading application running on a portable computer and wherein said at least one autonomous intermediate reader is in communication with the reporting system.

* * * * *